United States Patent
Soejima

(10) Patent No.: US 8,649,959 B2
(45) Date of Patent: Feb. 11, 2014

(54) CONTROL DEVICE FOR INTERNAL COMBUSTION ENGINE

(75) Inventor: Shinichi Soejima, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 284 days.

(21) Appl. No.: 13/122,498

(22) PCT Filed: Dec. 4, 2008

(86) PCT No.: PCT/JP2008/072054
§ 371 (c)(1),
(2), (4) Date: Apr. 4, 2011

(87) PCT Pub. No.: WO2010/064313
PCT Pub. Date: Jun. 10, 2010

(65) Prior Publication Data
US 2011/0191009 A1     Aug. 4, 2011

(51) Int. Cl.
*G06F 19/00* (2011.01)
*G06G 7/70* (2006.01)
*F02D 41/00* (2006.01)

(52) U.S. Cl.
USPC .......................................... 701/110; 123/361

(58) Field of Classification Search
USPC ......... 123/361, 376, 399, 403, 478, 492, 493; 701/85, 103, 110
See application file for complete search history.

(56) References Cited

U.S. PATENT DOCUMENTS

| | | | |
|---|---|---|---|
| 6,626,144 B1 * | 9/2003 | Kanamaru | 123/399 |
| 6,886,531 B1 * | 5/2005 | Kawakami et al. | 123/399 |
| 7,457,701 B2 * | 11/2008 | Tanaka | 701/103 |
| 2002/0078924 A1 * | 6/2002 | Yagi | 123/399 |
| 2007/0068489 A1 * | 3/2007 | Osumi et al. | 123/361 |

FOREIGN PATENT DOCUMENTS

| | | |
|---|---|---|
| DE | 102 19 382 A1 | 11/2002 |
| JP | A-2002-201998 | 7/2002 |
| JP | A-2002-332884 | 11/2002 |
| JP | A-2004-150275 | 5/2004 |
| JP | A-2005-194936 | 7/2005 |
| JP | A-2007-92531 | 4/2007 |
| JP | A-2008-2330 | 1/2008 |

OTHER PUBLICATIONS

International Search Report mailed Mar. 3, 2009 issued in International Patent Application No. PCT/JP2008/072054 (with translation).

* cited by examiner

*Primary Examiner* — Stephen K Cronin
*Assistant Examiner* — Sizo Vilakazi
(74) *Attorney, Agent, or Firm* — Oliff PLC

(57) ABSTRACT

To balance between air-fuel ratio controllability and torque response performance in a control device for an internal combustion engine performing a throttle delay control. An air quantity requirement is calculated based on torque required of an internal combustion engine. A throttle opening for achieving the air quantity requirement is calculated by using an inverse model of an intake system model that models response of a cylinder intake air quantity relative to an operation of a throttle. A throttle opening delayed by a predetermined delay time Td is outputted as an operation amount to the throttle. When, however, there is no allowance for introducing the delay time Td between the response time of the cylinder intake air quantity to a throttle operation to be achieved at a current engine speed and a torque response time requirement, the delay processing of the throttle opening is restricted by, for example, making the delay time Td zero or shortening the delay time Td.

4 Claims, 4 Drawing Sheets

(a) Without air inverse model    (b) With air inverse model

CONTROL DEVICE FOR INTERNAL COMBUSTION ENGINE

TECHNICAL FIELD

The present invention relates, in general, to control devices for internal combustion engines and, more particularly, to a control device for an internal combustion engine having an electronically controlled throttle.

BACKGROUND ART

In an internal combustion engine having an electronically controlled throttle, typically, a throttle opening is set based on, for example, an accelerator operation amount achieved by a driver and a throttle is operated according to the set throttle opening. If, at this time, a delay time is set before the throttle is operated after the throttle opening is set, an actual throttle opening changes at timing later than the set throttle opening for the set delay time. Such a throttle delay control allows a future throttle opening to be estimated for the delay time involved using the throttle opening before the delay control. The throttle delay control is effective in enhancing controllability of an air-fuel ratio to thereby improve exhaust emission performance for the following reason. A cylinder intake air quantity is defined at timing at which an intake valve is closed. The throttle delay control estimates with high accuracy the throttle opening at that particular timing to thereby allow a fuel injection quantity to be calculated based on the cylinder intake air quantity obtained from the estimated throttle opening.

A time delay is, however, introduced in torque response of the internal combustion engine to torque requirements by a driver. FIG. 6 is a diagram showing a relationship between a response time (e.g. 63% response time) and an engine speed when the torque response of the internal combustion engine to torque requirements is represented by a first order lag characteristic. A solid line in FIG. 6 shows the relationship between the response time and the engine speed when the throttle opening is set based on the accelerator operation amount and the throttle is operated without the delay control, and a dotted line shows the relationship between the response time and the engine speed achieved when the delay control is performed. From a standpoint of drivability, desirably, the response time is as short as possible. In addition, torque control is used in various vehicle control systems including a vehicle stability control system (VSC), a traction control system (TRC), and an electronic controlled transmission (ECT). To make effective the torque control by these control systems, desirably, the response time is as short as possible.

As observed above, a need exists in the throttle delay control to balance between air-fuel ratio controllability and torque response performance. JP-A-2004-150275, for example, focuses on this need. This publication discloses a technique in which, when an urgent valve closing request is made in VSC control or TRC control, the throttle delay control is interrupted and, instead, the throttle is immediately driven toward a target opening.

In the technique disclosed in the abovementioned Patent Document, however, there is still room for improvement in balancing between air-fuel ratio controllability and torque response performance. Referring to FIG. 6, should an urgent valve closing request be made, the technique disclosed in the above Patent Document allows the response time to be shortened by interrupting the delay control. However, the higher the engine speed, the shorter the response time. Understandably, therefore, a sufficiently high torque response can be obtained without needing to interrupt the delay control, if the engine speed is high when the urgent valve closing request is made. If, on the other hand, the engine speed is low when the urgent valve closing request is made, a sufficient torque response may not be obtained even by interrupting the delay control.

DISCLOSURE OF INVENTION

The present invention has been made to solve the foregoing problems and it is an object of the present invention to balance between air-fuel ratio controllability and torque response performance in a control device for an internal combustion engine performing a throttle delay control.

A control device for an internal combustion engine according to an aspect of the present invention estimates an opening of a throttle at a predetermined future point in time and calculates a predetermined parameter value involved in an air-fuel ratio control based on the estimated throttle opening. The control device includes means for acquiring a torque requirement for the internal combustion engine and a response time requirement when the internal combustion engine changes generated torque in response to the torque requirement. The torque requirement and the torque response time requirement are supplied from a torque requirement generating source disposed external or internal of the control device of the aspect of the present invention. The magnitude of the torque required is variable and the torque response time required is also variable. One example of the torque requirement generating source is a vehicle control system, such as VSC or TRC. When an urgent torque requirement is sent from any of these systems, the requested torque response time is shorter than normal.

The control device according to the aspect of the present invention includes means for calculating an air quantity requirement based on the torque requirement and means having an inverse model of an intake system model that models response of a cylinder intake air quantity relative to an operation of the throttle and calculating, by using the inverse model, a throttle opening for achieving the air quantity requirement. The control device, having these means, can set a throttle opening that can achieve high torque response, as compared with a case in which the throttle opening is set based on an accelerator operation amount.

The control device according to the aspect of the present invention includes: means for delaying the calculated throttle opening by a predetermined delay time; means for outputting the delay-processed throttle opening to the throttle as an operation amount; and means for estimating a throttle opening at the predetermined future point in time based on the throttle opening before the delay processing. As the control device performs the throttle delay control by using the foregoing means, controllability of the air-fuel ratio is enhanced, thereby improving exhaust emission performance. Note, however, that such a delay control results in the torque response time being extended for the delay time. The control device according to the aspect of the present invention, however, uses the inverse model of the intake system model as described above to calculate the throttle opening, which inhibits the throttle delay control from impairing torque response.

Further, the control device according to the aspect of the present invention includes means for restricting the delay processing of the throttle opening. Restricting the delay processing may, in one form, be making the delay time zero, specifically, stopping the delay processing, in addition to shortening the delay time. Restricting the delay processing for the throttle opening is performed based on a decision made by determining means. The determining means determines whether or not the delay processing of the throttle opening by using the delay time is allowed, based on time allowed between a response time of the cylinder intake air quantity relative to the operation of the throttle to be achieved at a current engine speed and a torque response time requirement. One example of making a decision is that it is determined that the delay processing is not allowed, in a case where the allowance time is shorter than a set delay time. Alternatively, in a case where the allowance time is shorter than the delay time with only a small difference therebetween (the difference is equal to, or less than, a predetermined threshold), it may be determined that the delay processing is allowed. Or, by contrast, in a case where the allowance time is longer than the delay time with only a small difference therebetween (the difference is equal to, or less than, a predetermined threshold), it may be determined that the delay processing is not allowed.

As described above, the response time of the cylinder intake air quantity relative to the throttle operation varies with different engine speeds even when the throttle opening is calculated by using the inverse model of the intake system model. The response time of the cylinder intake air quantity is slow at low engine speeds and is faster as the engine speed increases. Depending on the relationship between the torque response time requirement and the engine speed at that particular point in time, therefore, the torque response time requirement may not be achievable if the delay processing is performed. In such cases, in the control device according to the aspect of the present invention, the delay processing of the throttle opening is restricted based on the allowance time, so that torque response as a result of achieving the torque response time requirement can be balanced well with controllability of the air-fuel ratio through performance of the delay processing.

The control device according to the aspect of the present invention may further include means for extending, when the delay processing is not restricted, the delay time such that an actual torque response time does not exceed the torque response time requirement. Such means allows controllability of the air-fuel ratio to be further improved through the longer delay time, while reliably achieving the torque response time requirement.

DESCRIPTION OF REFERENCE NUMERALS

Figure 1:
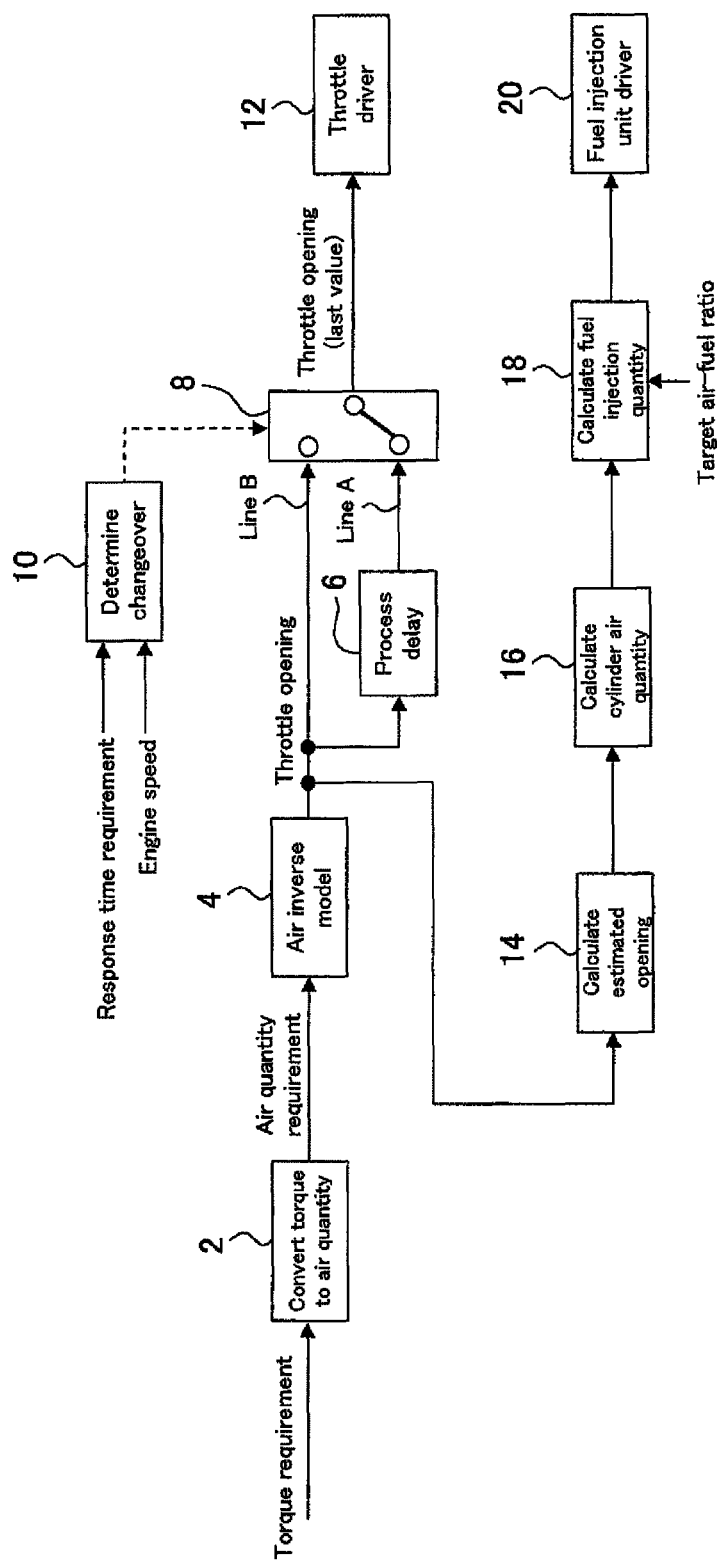
FIG. 1 is a block diagram showing a configuration of a control device for an internal combustion engine according to a first embodiment of the present invention.

2 Air quantity requirement calculating section
4 Throttle opening calculating section
6 Delay processing section
8 Output changeover section
10 Changeover determining section
12 Throttle driver
14 Estimated opening calculating section
16 Air quantity calculating section
18 Fuel injection quantity calculating section
20 Fuel injection unit driver
24 Delay time setting section
26 Variable delay processing section

BEST MODES FOR CARRYING OUT THE INVENTION

First Embodiment

A first embodiment of the present invention will be described with reference to FIGS. 1 to 3.

Figure 2:
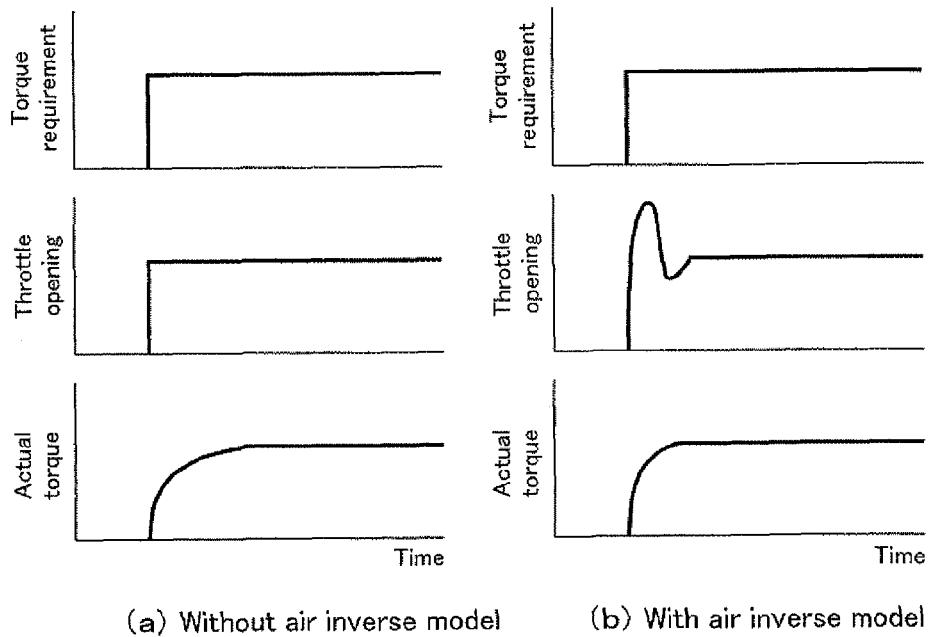
FIG. 2 is a diagram comparing response in throttle opening and actual torque to torque requirements between a case using an air inverse model and a case not using the air inverse model.

FIG. 1 is a block diagram showing a configuration of a control device for an internal combustion engine according to the first embodiment of the present invention. The control device of this embodiment is configured to operate a throttle and a fuel injection unit as actuators of the internal combustion engine based on torque requirements for the internal combustion engine. Arrangements of the control device of this embodiment will be described below with reference to FIG. 1.

Arrangements of the control device for operating the throttle will be described first. The throttle according to this embodiment is an electronically controlled type operated by a throttle motor. A throttle opening as a throttle operation amount is calculated based on torque requirements.

Torque requirements supplied to the internal combustion engine include that requested by a driver, specifically, that calculated from an accelerator operation amount, and that requested by a vehicle control system, for example, VSC, TRC, and ECT. These torque requirements are supplied to the control device by a power train manager (hereinafter referred to as a "PTM") that integrally controls an entire drive system of the vehicle. The PTM also supplies the control device with a requirement relating to a response time involved when the internal combustion engine changes a generated torque in response to the torque requirements. The response time requirement (torque response time being requested) supplied by the PTM indicates a degree of urgency of the torque requirement, so that the shorter the response time requirement, the more quickly the torque requirement is required to be met. For example, when a torque requirement requested by the driver is compared with a torque requirement requested by a control system, such as VSC, the latter torque requirement should be met more quickly. Accordingly, the response time requirement is set to be relatively long for only the torque requirement requested by the driver; however, if a torque requirement requested by, for example, the VSC is included, the response time requirement is set to be shorter. As will be described later, in the control device of this embodiment, the throttle opening is determined in consideration of not only the torque requirement, but also the response time requirement.

The control device acquires the torque requirement and calculates an air quantity required for achieving the torque requirement. This calculation is performed by an air quantity requirement calculating section 2. The air quantity requirement calculating section 2 converts the torque requirement into a corresponding air quantity requirement by using an air quantity map. The air quantity map uses, as parameters, ignition timing, engine speed, air-fuel ratio, valve timing, and various other operating conditions affecting a relation between the torque and the air quantity. The air quantity requirement calculating section 2 finds the air quantity converted from the torque requirement to calculate the air quantity requirement.

Next, the control device calculates a throttle opening for achieving the air quantity requirement. This calculation is performed by a throttle opening calculating section 4. The throttle opening calculating section 4 is provided with an air inverse model. An air model represents a physical model of an intake system that models response of the cylinder intake air quantity relative to an operation of the throttle based on, for example, fluid dynamics. The air inverse model is an inverse of the air model. The air model may be composed of a single unit or a plurality of units. Take the latter case, for instance. Then, the air model may be formed by connecting several physical models together, one representing with a mathematical expression a relation between the throttle opening and a throttle passing air quantity, another representing with a mathematical expression a relation between the throttle passing air quantity and an intake pipe pressure, and the other representing with a mathematical expression a relation between the intake pipe pressure and the intake air quantity. By inputting the air quantity requirement into an inverse model of the air model, an intake pipe pressure requirement for achieving the air quantity requirement is calculated, a throttle passing air quantity requirement for achieving the intake pipe pressure requirement is calculated, and a throttle opening for achieving the throttle passing air quantity requirement is calculated.

By using the air inverse model and appropriately setting model parameters, the response speed of an actual cylinder intake air quantity relative to the air quantity requirement can be freely adjusted. As compared with a case in which the air inverse model is not used (for example, the throttle opening is obtained through linear translation of the torque requirement), a throttle opening that can achieve a higher torque response can be set. FIG. 2 is a diagram comparing changes in the throttle opening and the actual torque with changing torque requirements between a case (a) in which an air inverse model is not used and a case (b) in which the air inverse model is used. The figures show that use of the air inverse model allows the throttle opening to be temporarily overshot, which improves a rising speed of the actual torque. In this embodiment, parameters of the air inverse model are set so that the actual cylinder intake air quantity may respond to the air quantity requirement at the fastest speed.

The control device next inputs the calculated throttle opening into an output changeover section 8. Signal input lines from the throttle opening calculating section 4 to the output changeover section 8 are divided into two: line A and line B. Signals are inputted over the input line A by way of a delay processing section 6. The delay processing section 6 outputs the signal inputted thereto with a predetermined delay time Td introduced to the same. Any value may be set for the delay time Td. In this embodiment, the delay time Td is fixed to four cycles (32 msec.) of a calculation cycle (e.g. 8 msec.) of the throttle opening. Signals are inputted directly from the throttle opening calculating section 4 to the output changeover section 8 over the input line B.

The output changeover section 8 selects either one of the signals inputted through the two lines and outputs the selected signal to a throttle driver 12. The throttle driver 12 directly operates the throttle. The throttle driver 12 receives a throttle opening from the output changeover section 8 and outputs the throttle opening as an opening command value to the throttle.

The output changeover section 8 selects a specific input line according to a changeover command from a changeover determining section 10. When the output changeover section 8 selects the input line A, a delayed throttle opening is outputted to the throttle. In this case, a response lag for the delay time is introduced between the torque requirement and the actual torque achieved through throttle operation. The changeover determining section 10 selects, as a rule, the input line A; only when a predetermined changeover condition is met, the changeover determining section 10 directs to switch to the input line B. Details of the changeover condition will be described in detail later. When the output changeover section 8 selects the input line B, the throttle opening calculated by the throttle opening calculating section 4 is directly outputted to the throttle. In this case, the actual torque achieved through the throttle operation promptly follows the torque requirement.

Next, arrangements of the control device for operating the fuel injection unit will be described. The fuel injection unit is directly operated by a fuel injection unit driver 20. The fuel injection unit driver 20 receives a fuel injection quantity value from an upstream calculating element and, based on the fuel injection quantity value, calculates a drive time and a drive start or end timing for the fuel injection unit. The fuel injection unit driver 20 drives the fuel injection unit according to the calculated drive time and drive start or end timing. The fuel injection unit may be a type that injects fuel into an intake port or directly into a cylinder. Alternatively, the fuel injection unit may be a type that injects part of fuel required into the intake port and the rest of the fuel required directly into the cylinder.

The fuel injection quantity is calculated by a fuel injection quantity calculating section 18. The fuel injection quantity calculating section 18 calculates the fuel injection quantity based on an estimated value of the cylinder intake air quantity and a target value of a cylinder air-fuel ratio (target air-fuel ratio) achieved through fuel injection. When an air-fuel ratio feedback control is performed for correcting the fuel injection quantity such that an exhaust gas air-fuel ratio is the target air-fuel ratio, a feedback correction coefficient thereof is also incorporated in calculating the fuel injection quantity.

The cylinder intake air quantity is calculated by an air quantity calculating section 16. The air quantity calculating section 16 acquires a throttle opening at intake valve closing timing, specifically, timing when the cylinder intake air quantity is defined and calculates the air quantity achieved by the throttle opening by using the abovementioned air model. The air quantity calculating section 16 outputs an estimated value of the cylinder intake air quantity calculated with the air model to the fuel injection quantity calculating section 18.

The throttle opening used for calculating the cylinder intake air quantity is calculated by an estimated opening calculating section 14. To accurately calculate the cylinder intake air quantity, the throttle opening at the timing when the intake valve is closed is required as information. In order, however, to perform fuel injection at appropriate timing, calculation of the fuel injection quantity must be completed before the intake valve is closed. Consequently, an actual throttle opening at future timing when the intake valve is closed cannot be acquired at the timing of calculating the fuel injection. The estimated opening calculating section 14 therefore estimates a throttle opening during such a future time that will arrive after the lapse of a period of time (hereinafter referred to as an "anticipatory time") that begins with a current point in time, specifically, when the fuel injection quantity is calculated and ends when the intake valve is closed. The estimated opening calculating section 14 then outputs the estimated throttle opening as the throttle opening at timing when the intake valve is closed to the air quantity calculating section 16.

Estimation of the throttle opening at timing when the intake valve is closed is made based on the throttle opening before delay processing that is inputted every calculation cycle from the throttle opening calculating section 4 to the estimated opening calculating section 14. Specific methods of estimation vary depending on which input line, A or B, is selected by the output changeover section 8.

When the input line A is selected by the output changeover section 8, the throttle operation is performed according to the delay-processed throttle opening. As a result, the throttle opening before delay processing inputted from the throttle opening calculating section 4 corresponds to an estimated throttle opening value at a future time delayed from the current time. When the delay time is longer than the anticipatory time, therefore, the throttle opening at timing when the intake valve is closed can be estimated by checking a history of inputs of the throttle opening from the throttle opening calculating section 4. Note that a discrepancy may occur between the throttle opening outputted from the throttle driver 12 (an opening command value) and the actual throttle opening because of a response lag of the throttle relative to the opening command value. A possible approach to be taken in such cases is to prepare a throttle model that models response characteristics of the throttle and to process the throttle opening inputted from the throttle opening calculating section 4 with the throttle model, thereby obtaining an actual throttle opening at such a future time that will arrive after the lapse of the delay time from the current time.

The anticipatory time varies with different engine speeds and intake valve timing. For example, the higher the engine speed, the shorter the anticipatory time, and the anticipatory time is shorter with advancing valve timing. Accordingly, the delay time may become shorter than the anticipatory time. In such cases, the throttle opening at timing when the intake valve is closed cannot be estimated with only the history of inputs of the throttle opening from the throttle opening calculating section 4. In this case, the estimated opening calculating section 14 calculates an estimated rate of change in the throttle opening at a point in time after the lapse of the delay time from the current time. By using that estimated rate of change, an estimated quantity of change in the throttle opening is calculated for a period of time that begins when the delay time elapses and ends when the intake valve is closed. The throttle opening at timing when the intake valve is closed can be estimated by adding the above-described quantity of change in the throttle opening to the estimated throttle opening at the point in time after the lapse of the delay time from the current time.

When the input line B is selected by the output changeover section 8, the throttle operation is performed according to the throttle opening that has not been subjected to delay processing. As a result, there is no time lag between the throttle opening inputted from the throttle opening calculating section 4 to the estimated opening calculating section 14 and the throttle opening outputted from the throttle driver 12 to the throttle. In this case, the estimated opening calculating section 14 calculates a rate of change in the throttle opening inputted from the throttle opening calculating section 4, specifically, a rate of change in the actual throttle opening at a current point in time. By using that estimated rate of change, an estimated quantity of change in the throttle opening is calculated for a period of time that begins with the current point in time and ends when the intake valve is closed. The throttle opening at timing when the intake valve is closed can be estimated by adding the above-described quantity of change in the throttle opening to the throttle opening at the current point in time. If there is a discrepancy between the throttle opening outputted from the throttle driver 12 (the opening command value) and the actual throttle opening, the throttle model described earlier may be used to calculate the actual throttle opening or the rate of change therein.

As described heretofore, in the control device according to this embodiment, the method of estimating the throttle opening at timing when the intake valve is closed is changed according to which input line, A or B, is selected by the output changeover section 8. A comparison made in terms of estimation accuracy between a case in which the input line A is selected by the output changeover section 8 and a case in which the input line B is selected by the output changeover section 8 shows that the former apparently yields greater estimation accuracy. This estimation accuracy leads to calculation accuracy in the cylinder intake air quantity. Better controllability of the air-fuel ratio can therefore be obtained when the input line A is selected, specifically, when a throttle delay control is performed. In contrast, however, performing delay processing causes response of the throttle to the torque requirement to be delayed by the delay time, resulting in reduced torque response. With these things taken into consideration, it is important how controllability of the air-fuel ratio can be balanced with torque response when the input line A or B is selected by the output changeover section 8.

A decision made by the changeover determining section 10 as to which input line, A or B, to select, will be described below. As described earlier, the changeover determining section 10 determines whether to change the selection depending on whether or not a predetermined changeover condition is met. The changeover condition is that there is no allowance for the delay time Td between the response time of the cylinder intake air quantity to a throttle operation achieved at the current engine speed and the response time requirement supplied by the PTM.

Figure 3:
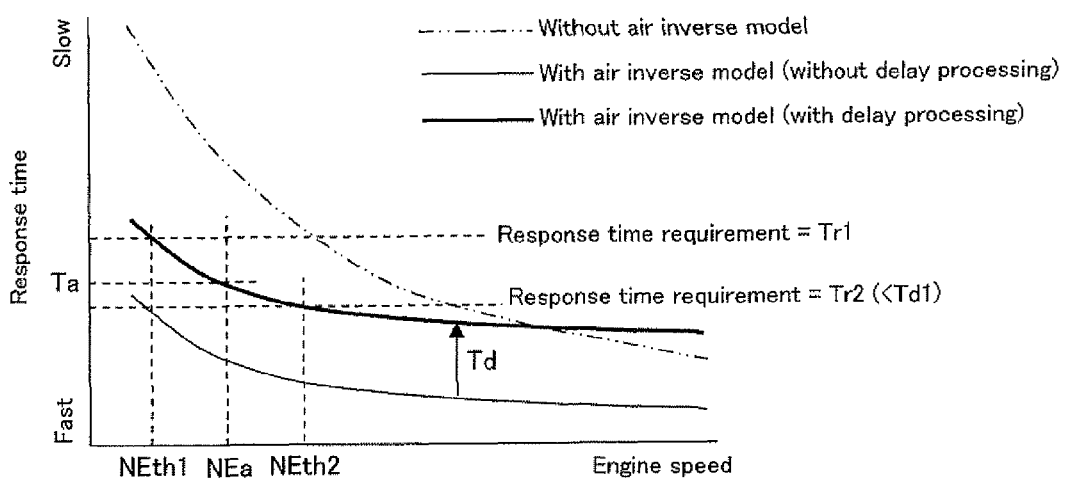
FIG. 3 is a diagram showing torque response characteristics obtained through a throttle control of the first embodiment of the present invention.

FIG. 3 is a diagram showing a relationship between the response time (e.g. 63% response time) and the engine speed when the torque response of the internal combustion engine to the torque requirement is represented by a first order lag characteristic. A solid line in FIG. 3 shows the relationship between the response time and the engine speed obtained by using the air inverse model. A dash-double-dot line shows the relationship between the response time and the engine speed obtained when the air inverse model is not used. Further, in the case in which the air inverse model is used, a heavy line shows the relationship between the response time achieved when the throttle delay control is performed (the input line A is selected) and the engine speed and a fine line shows the relationship between the response time achieved when the throttle delay control is not performed (the input line B is selected) and the engine speed. FIG. 3 verifies that the throttle delay control can be performed without impairing torque response through calculation of the throttle opening by using the air inverse model.

Note, however, that the response time varies with the engine speed even in the case of calculating the throttle opening by using the air inverse model. The response time is slow when the engine speed is low and is faster at higher engine speeds. Depending on the relationship between the response time requirement and the engine speed at that particular point in time, therefore, the response time requirement may not be achievable if the delay time Td is introduced. For example, referring to FIG. 3, when the current engine speed is NEa, a response time requirement Tr1 can be achieved even with the delay time Td; however, a response time requirement Tr2

(<Tr1) cannot be achieved if the delay time Td is introduced. This is because a response time Ta when the delay time Td is introduced exceeds the response time requirement Tr2. In FIG. 3, NEth1 denotes a lower limit of a speed range in which the delay time Td can be introduced for the response time requirement Tr1, and NEth2 denotes the lower limit for the response time requirement Tr2.

Under the abovementioned changeover condition, when the response time Ta achieved at the current engine speed NEa with the delay time Td exceeds the response time requirement Tr2 at the current point in time, the input line A is switched to the input line B to thereby interrupt the throttle delay control. Even if, for example, the response time requirement is considerably shortened as a result of the torque requirement from, for example, the VSC, the foregoing arrangement allows the shortened response time requirement to be reliably achieved. The input line A is switched to the input line B only when there is no allowance for introducing the delay time Td, so that controllability of the air-fuel ratio will not be reduced more than is necessary. Specifically, in the control device of this embodiment, the throttle delay control can be performed, while the controllability of the air-fuel ratio is balanced with the torque response.

The control device according to the embodiment of the present invention has been described above. Following are correspondence between the embodiment and the present invention. In the arrangements shown in FIG. 1, the air quantity requirement calculating section 2 corresponds to "means for calculating an air quantity requirement" of the present invention. The throttle opening calculating section 4 corresponds to "means for calculating a throttle opening" of the present invention. The delay processing section 6 corresponds to "means for processing delay" of the present invention. The throttle driver 12 corresponds to "means for outputting an operation amount" of the present invention. The estimated opening calculating section 14 corresponds to "means for estimating a future opening" of the present invention. The changeover determining section 10 corresponds to "determining means" of the present invention. The output changeover section 8 corresponds to "means for restricting delay processing" of the present invention.

Second Embodiment

A second embodiment of the present invention will be described with reference to FIGS. 4 and 5.

Figure 4:
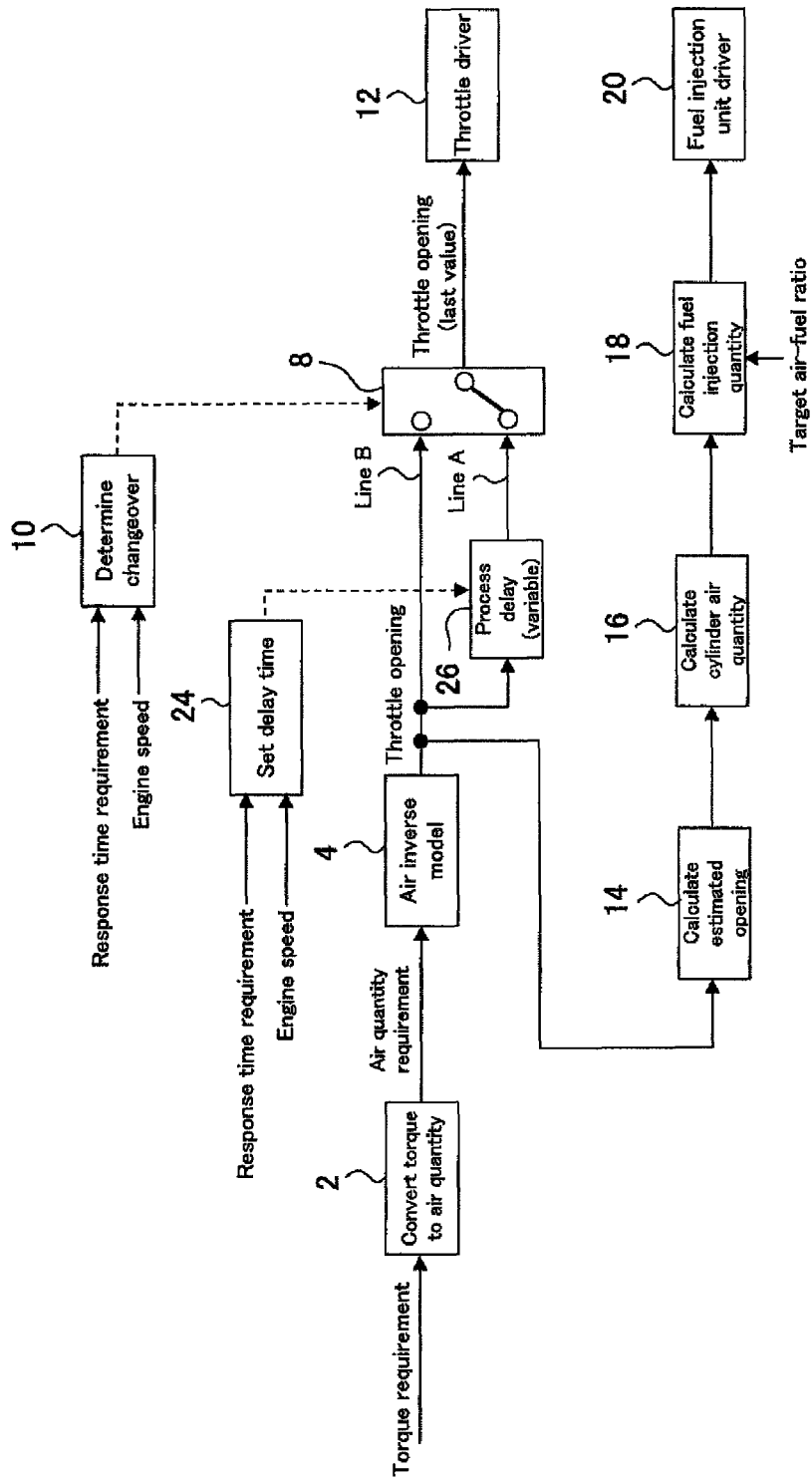
FIG. 4 is a block diagram showing a configuration of a control device for an internal combustion engine according to a second embodiment of the present invention.

FIG. 4 is a block diagram showing a configuration of a control device for an internal combustion engine according to the second embodiment of the present invention. In FIG. 4, like or corresponding elements are identified by the same reference numerals as those used for the first embodiment. In the following, descriptions for the arrangements and functions found in common with the first embodiment will be omitted or simplified and focus is placed on those different from the first embodiment.

The control device of this embodiment is characterized by including a variable delay processing section 26 in place of the delay processing section 6 of the first embodiment. The variable delay processing section 26 can vary the delay time relating to delay processing, the delay time being here selectable from among a delay time Td0 of four cycles (32 msec.) of a calculation cycle (e.g. 8 msec.), a delay time Td1 of five cycles, a delay time Td2 of six cycles, and a delay time Td3 of seven cycles.

The delay time for the variable delay processing section 26 is set by a delay time setting section 24. The delay time setting section 24 defaults to the delay time Td0 of four cycles and selects a longer delay time Td1, Td2, or Td3 as appropriately according to allowance time relative to the response time requirement. The delay time setting section 24 constitutes, together with the variable delay processing section 26, "means for restricting delay processing" of the present invention.

Figure 5:
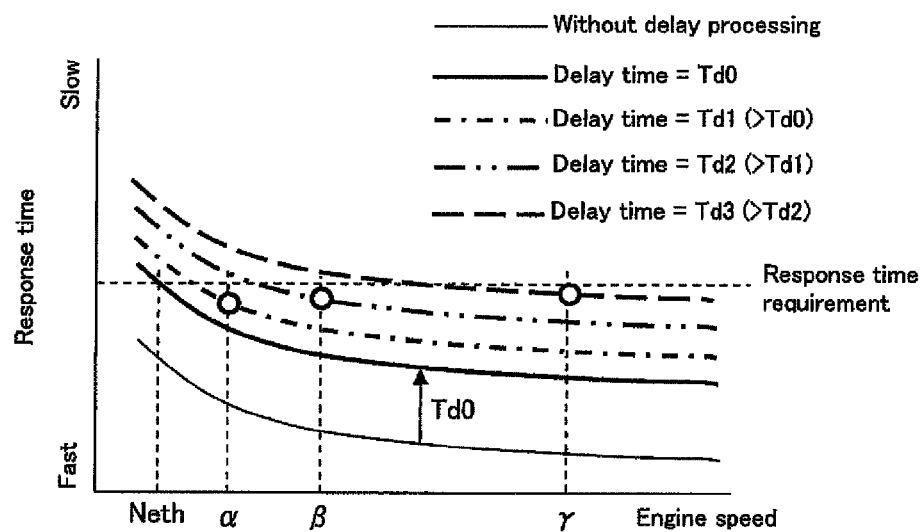
FIG. 5 is a diagram showing torque response characteristics obtained through a throttle control of the second embodiment of the present invention.
Figure 6:
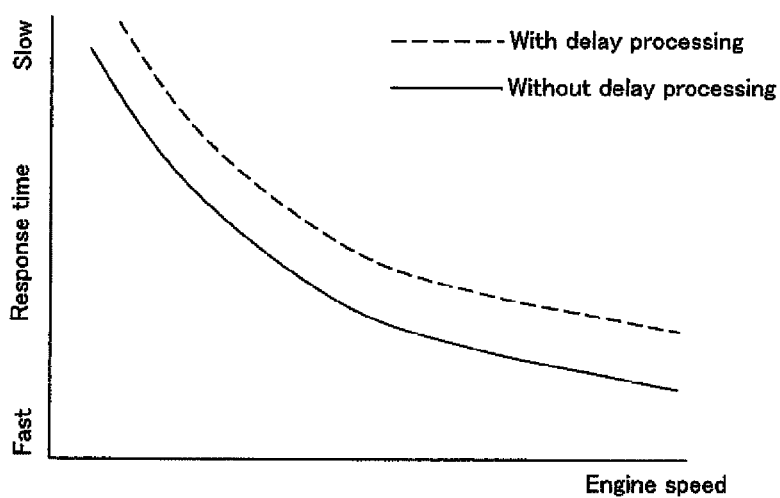
FIG. 6 is a diagram showing torque response characteristics obtained through a throttle control of the related art.

FIG. 5 is a diagram showing a relationship between the response time (e.g. 63% response time) and the engine speed when the torque response of the internal combustion engine to the torque requirement is represented by a first order lag characteristic. The figure shows the relationship between the response time and the engine speed when each of the delay times Td0, Td1, Td2, and Td3 is selected. Since the response time varies with different engine speeds, the delay time to be selectable changes depending on the engine speed even with a constant response time requirement. For example, when the current engine speed is a, the longest delay time selectable is Td1. When the current engine speed is β, the longest delay time selectable is Td2. When the engine speed increases to y, the delay time Td3 can now be selected. In the control device according to this embodiment, therefore, an even longer delay time can be secured, while the response time requirement is reliably achieved, so that controllability of the air-fuel ratio can be further improved.

MISCELLANEOUS

The present invention, which has been described with particularity relative to the detailed description of the exemplary embodiments, is not nonetheless limited to the above-described embodiments and various changes in form and detail may be made therein without departing from the spirit and scope of the invention. For example, the above-described embodiments may be modified as follows.

Specifically, the changeover condition for switching from the input line A to the input line B according to the embodiments described above may be changed to either one of the following two modified examples. In a first modified example, the changeover condition is that a response time Ta achieved at a current engine speed with a delay time Td introduced exceeds a response time requirement Tr at the current point in time and that a difference involved therein is greater than a predetermined time X. Specifically, the changeover condition is to meet "Ta−Tr>X". In a second modified example, the changeover condition is that the response time Ta is shorter than the response time requirement Tr, but that the difference involved therein is smaller than a predetermined time Y. Specifically, the changeover condition is to meet "Tr−Ta<Y".

Additionally, in the above-described embodiment, the delay control is interrupted, when there is no allowance for the delay time to be introduced between the response time of the cylinder intake air quantity relative to the throttle operation achieved at the current engine speed and the response time requirement. The delay time may, instead, be shortened. Specifically, interrupting the delay control, specifically, making the delay time zero is one example of restricting the delay processing and the delay time has only to be shorter than normal. Any method will do for shortening the delay time. The method may be for switching the signal as in the embodiments, or for correcting the delay time used in calculation with a coefficient.

The invention claimed is:
1. A control device for an internal combustion engine, the control device estimating an opening of a throttle at a predetermined future point in time and calculating a predetermined parameter value involved in an air-fuel ratio control based on the estimated throttle opening, the control device comprising:

- means for acquiring a torque requirement for the internal combustion engine and a response time requirement when the internal combustion engine changes generated torque in response to the torque requirement;
- means for calculating an air quantity requirement based on the torque requirement;
- throttle opening calculating means having an inverse model of an intake system model that models response of a cylinder intake air quantity relative to an operation of the throttle, for calculating, by using the inverse model, a throttle opening for achieving the air quantity requirement;
- delay processing means for delaying the throttle opening calculated by the throttle opening calculating means by a predetermined delay time;
- means for outputting the throttle opening outputted from the delay processing means to the throttle as an operation amount;
- means for estimating a throttle opening at the predetermined future point in time based on the throttle opening before the delay processing performed by the delay processing means;
- means for determining whether or not the delay processing of the throttle opening by using the delay time is allowed, based on time allowed between a response time of the cylinder intake air quantity relative to the operation of the throttle to be achieved at a current engine speed and a torque response time requirement; and
- delay processing restricting means for restricting the delay processing of the throttle opening performed by the delay processing means, when it is determined that the delay processing of the throttle opening by using the delay time is not allowed.

2. The control device for an internal combustion engine according to claim 1, further comprising:

- means for extending, when the delay processing is not restricted by the delay processing restricting means, the delay time such that an actual torque response time does not exceed the torque response time requirement.

3. A control device for an internal combustion engine, the control device estimating an opening of a throttle at a predetermined future point in time and calculating a predetermined parameter value involved in an air-fuel ratio control based on the estimated throttle opening, the control device comprising:

- a unit for acquiring a torque requirement for the internal combustion engine and a response time requirement when the internal combustion engine changes generated torque in response to the torque requirement;
- a unit for calculating an air quantity requirement based on the torque requirement;
- a throttle opening calculating unit having an inverse model of an intake system model that models response of a cylinder intake air quantity relative to an operation of the throttle, for calculating, by using the inverse model, a throttle opening for achieving the air quantity requirement;
- a delay processing unit for delaying the throttle opening calculated by the throttle opening calculating unit by a predetermined delay time;
- a unit for outputting the throttle opening outputted from the delay processing unit to the throttle as an operation amount;
- a unit for estimating a throttle opening at the predetermined future point in time based on the throttle opening before the delay processing performed by the delay processing unit;
- a unit for determining whether or not the delay processing of the throttle opening by using the delay time is allowed, based on time allowed between a response time of the cylinder intake air quantity relative to the operation of the throttle to be achieved at a current engine speed and a torque response time requirement; and
- a delay processing restricting unit for restricting the delay processing of the throttle opening performed by the delay processing unit, when it is determined that the delay processing of the throttle opening by using the delay time is not allowed.

4. The control device for an internal combustion engine according to claim 1, further comprising:

- a unit for extending, when the delay processing is not restricted by the delay processing restricting unit, the delay time such that an actual torque response time does not exceed the torque response time requirement.

* * * * *